Patented July 8, 1941

2,248,488

UNITED STATES PATENT OFFICE 2,248,488

NONFLAMMABLE ORGANIC HEAT TRANSFER AGENT

Ray H. Boundy and Robert R. Dreisbach, Midland, Mich., assignors to The Dow Chemical Company, Midland, Mich., a corporation of Michigan No Drawing. Application April 29, 1939, Serial No. 270,903

3 Claims. (Cl. 252—78)

This invention concerns certain new non-flammable liquid organic heat transfer agents which contain as the essential ingredient a mixture of compounds having the formula

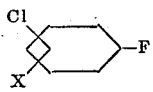

wherein X is chlorine or bromine.

The dihalo-fluorobenzenes having the above formula are prepared by chlorinating fluorobenzene to form dichloro-fluorobenzene or by successively chlorinating and brominating the fluorobenzene to obtain chloro-bromo-fluorobenzene, depending upon which product is desired. After completing the halogenation, the product is treated, e. g. with an alkali, to remove any dissolved hydrogen halide and is distilled to separate the dihalo-fluorobenzene product. In this distillation, it is not essential that the dihalo-fluorobenzene be completely purified, since the retention of by-products such as trichloro-fluorobenzene, dichloro-bromo-fluorobenzene, etc., which usually are formed in minor proportion along with the dihalo-flurobenzene, is not detrimental. Unreacted fluorobenzene, and any low boiling flammable by-products such as monochlorofluorobenzene, are of course preferably removed in the distillation, although the presence of up to 10 per cent by weight of chloro-fluorobenzene does not render the product flammable and may be tolerated in those instances where the low boiling point of this ingredient is not objectionable.

The dichloro-fluorobenzene and chloro-bromo-fluorobenzene products prepared as just described are thin liquid mixtures of isomeric compounds. We have found that they possess an unusual combination of properties which renders them especially useful as the essential ingredients in a series of new liquid heat transfer compositions which are suitable for use over a considerable range of temperatures. They are non-flammable and are substantially non-corrosive toward the usual structural metals, such as iron, steel, aluminum, etc. They have low freezing points, high boiling temperatures, and viscosities sufficiently low to permit ready flow with excellent heat transfer under the usual working conditions. Their physical properties are as follows:

It will be seen from the properties just given that each of these mixtures of isomeric dihalo-fluorobenzene are adapted to use at atmospheric pressure as a heat transfer agent at temperatures considerably below the freezing point and above the boiling point of water. Accordingly, these mixtures may be used as refrigerants at temperatures far below 0° C. or as heat transfer agents, e. g. radiator fluids for internal combustion engines, at temperatures ranging up to from 172° to 194° C. Their non-flammability, non-corrosiveness toward metals, and their combination of physical properties render them ideally suited to these and a variety of other heat transfer purposes. By employing them in a closed system at super-atmospheric pressure, they may, of course, be used for heat transfer purposes at temperatures considerably above their normal boiling points, e. g. at temperatures of 350° to 400° C. or above. In all such heat transfer operations, as is well known, the liquid heat transfer agents is contacted simultaneously or alternately with a relatively hot surface, e. g. the cylinder block of an internal combustion engine, and a relatively cool surface, e. g. the metal surfaces of a radiator, whereby heat is caused to flow from the relatively hot surface to the liquid heat transfer agent and from the latter to the relatively cool surface.

Although the above-described dihalo-fluorobenzene isomeric mixtures are each well suited to use without dilution as a heat transfer agent, they are usually employed in admixture with other halogenated aromatic hydrocarbons, such as ortho-dibromobenzene, trichlorobenzene, tetrachloro-benzene, dibromo-toluene, etc., which are either non-flammable or difficultly flammable, but which, because of their relatively high freezing temperatures or other objectionable properties, are not as well suited to be used alone for such purposes as are the dihalo-fluorobenzenes. By diluting the dihalo-fluorobenzene mixtures with such other halogenated aromatic hydrocarbons, the cost of the final products may be reduced and the properties desired in the heat transfer agents, e. g. low freezing point or low viscosity, etc., may often be improved. Such heat transfer agents comprising the dihalo-fluorobenzene isomers along with other halogenated aromatic hydrocarbons are compounded so as to remain liquid at temperatures below −20° C.,

| Isomeric mixture | B. P. °C. at 760 mm. | F. P. °C. | Sp. gr. 25°/25° C. | Viscosity in millipoises at— | | |
|---|---|---|---|---|---|---|
| | | | | 0° F. | 100° F. | 235° F. |
| Dichloro-fluorobenzenes | 172 | −35 | 1.407 | 30.2 | 10.4 | 4.75 |
| Chloro-bromo-fluorobenzenes | 194 | −26 | 1.7277 | | 14.4 | 6.1 | and preferably below −25° C. They usually contain at least 20 per cent by weight, and preferably more than 50 per cent, of the dihalofluorobenzene isomers.

The following examples describe several heat transfer compositions which have been prepared in accordance with the invention, but are not to be construed as limiting the invention.

*Example 1*

To 9 parts by weight of the isomeric mixture of dichloro-fluorobenzenes, prepared by the chlorination of fluorobenzene, there was added 1 part of ortho-dibromobenzene. The resultant solution was a thin non-flammable liquid having the following properties: boiling temperature range at atmospheric pressure, 172° C.–219° C.; specific gravity at 0° F. with respect to water at 4° C., 1.524; viscosity in millipoises at 0° F., 38.52; specific gravity at 250° F., 1.382; viscosity at 250° F., 4.87 millipoises. It was a clear liquid at −39° C., but was frozen at −46° C.

*Example 2*

To 4 parts by weight of the isomeric dichlorofluorobenzene mixture mentioned in Example 1, there was added 1 part of a mixture of isomeric chloro-bromo-fluorobenzenes, prepared by the successive chlorination and bromination of fluorobenzene. The resultant solution was a clear liquid at −29° C., but froze at temperatures between −30° and −34° C. It boiled at atmospheric pressure over the temperature range 174°–186° C. It had the specific gravity 1.526 at 0° F. or 1.343 at 250° F., and the absolute viscosity 33.80 millipoises at 0° F., or 4.65 millipoises at 250° F. It was non-flammable and substantially non-corrosive toward usual structural metals, e. g. iron, steel, aluminum, etc.

*Example 3*

To 82 parts by weight of the dichloro-fluorobenzene isomeric mixture mentioned in the preceeding examples there were added 9 parts of ortho-dibromobenzene and 9 parts of trichlorobenzene. The resultant solution was a thin non-flammable liquid which remained clear and mobile at −35° C., but froze at temperatures between −37° and −40° C. It boiled over the temperature range 173°–212° C. and had a specific gravity of 1.510 at 0° F., or 1.320 at 250° F. Its viscosity was 33.50 millipoises at 0° F. or 4.84 millipoises at 250° F.

*Example 4*

A non-flammable thin liquid heat transfer agent was prepared by adding to 75 parts of dichloro-fluorobenzene, 17 parts of chloro-bromo-fluorobenzene and 8 parts of trichlorobenzene. The resultant solution was a clear liquid at −30° C., but froze at temperatures from −32° to −35° C. It boiled over the temperature range 172°–193° C.; had a specific gravity of 1.505 at 0° F. or 1.327 at 250° F.; and an absolute viscosity of 33.70 millipoises at 0° F. or 4.76 millipoises at 250° F.

Other modes of applying the principle of the invention may be employed instead of those explained, change being made as regards the compositions herein disclosed, provided the ingredient or ingredients stated in any of the following claims or the equivalent of such stated ingredient or ingredients be employed.

We therefore particularly point out and distinctly claim as our invention:

1. The method of transferring a heat which comprises contacting a non-flammable liquid, containing as an essential ingredient a mixture of compounds having the formula

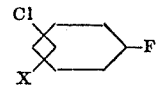

wherein X is a halogen substituent of the class consisting of chlorine and bromine, with a relatively hot surface and with a relatively cool surface, whereby heat flows from the relatively hot surface to the liquid and from the latter to the cooler surface.

2. The method of transferring heat which comprises contacting a non-flammable liquid, having a freezing point below −20° C. and consisting essentially of a mixture of nuclearly halogenated aromatic hydrocarbons containing at least 20 per cent of isomeric dichloro-fluorobenzenes, with a relatively hot surface and a relatively cool surface, whereby heat flows from the relatively hot surface to the liquid and from the latter to the cooler surface.

3. The method of transferring heat which comprises contacting a non-flammable liquid, having a freezing point below −20° C. and containing at least 50 per cent of an isomeric mixture of dichloro-fluorobenzenes and a minor proportion of a nuclearly halogenated aromatic compound selected from the class consisting of chlorobromofluorobenzene, ortho-dibromobenzene and trichlorobenzene, with a relatively hot surface and with a relatively cool surface, whereby heat flows from the relatively hot surface to the liquid and from the latter to the cooler surface.

RAY H. BOUNDY.
ROBERT R. DREISBACH.